(12) United States Patent
Takahashi et al.

(10) Patent No.: US 7,393,282 B2
(45) Date of Patent: Jul. 1, 2008

(54) COUPLING STRUCTURE OF STEERING TORQUE TRANSMITTING MEMBER FOR STEERING SHAFT

(75) Inventors: Kazunori Takahashi, Gunma-ken (JP); Seiichi Tachikawa, Gunma-ken (JP)

(73) Assignee: NSK Ltd., Tokyo (JP)

( * ) Notice: Subject to any disclaimer, the term of this patent is extended or adjusted under 35 U.S.C. 154(b) by 180 days.

(21) Appl. No.: 10/525,946

(22) PCT Filed: Aug. 28, 2003

(86) PCT No.: PCT/JP03/10917

§ 371 (c)(1),
(2), (4) Date: Feb. 28, 2005

(87) PCT Pub. No.: WO2004/020860

PCT Pub. Date: Mar. 11, 2004

(65) Prior Publication Data

US 2005/0239559 A1  Oct. 27, 2005

(30) Foreign Application Priority Data

Aug. 28, 2002 (JP) .............................. 2002-249384

(51) Int. Cl.
*F16D 3/78* (2006.01)
(52) U.S. Cl. .......................... 464/93; 411/399; 464/138
(58) Field of Classification Search .......... 464/93–96, 464/137, 138, 98; 74/492; 411/180, 181, 411/399, 501
See application file for complete search history.

(56) References Cited

U.S. PATENT DOCUMENTS

| 2,067,284 A | * | 1/1937 | Pearce ......................... 464/96 |
| 2,564,905 A | * | 8/1951 | Kaye ............................ 464/96 |
| 2,982,118 A | * | 5/1961 | Franceschetti et al. ......... 464/93 |
| 3,684,999 A | * | 8/1972 | LaFramboise ............ 464/94 X |
| 5,201,545 A | * | 4/1993 | Boersma ................... 74/492 X |
| 5,222,913 A | | 6/1993 | Nagashima ................... 464/93 |
| 5,632,684 A | | 5/1997 | Kumar et al. |
| 5,888,139 A | | 3/1999 | Hoshino ...................... 464/98 |
| 6,190,259 B1 | | 2/2001 | Higashino |
| 6,626,763 B2 | * | 9/2003 | Aoki et al. ................ 464/94 X |

FOREIGN PATENT DOCUMENTS

| GB | 2 312 035 | 10/1997 |
| JP | 60-201119 | 10/1985 |
| JP | 3-4031 | 1/1991 |
| JP | 9-280264 | 10/1997 |

* cited by examiner

*Primary Examiner*—Greg Binda
(74) *Attorney, Agent, or Firm*—Miles & Stockbridge P.C.

(57) ABSTRACT

A coupling structure for coupling a pair of steering torque transmitting members interposed in a steering shaft is arranged such that a steering torque is transmitted from one of the steering torque transmitting members to the other through a pin. One of the steering torque transmitting members has a pin insertion hole formed with a large diameter hole portion, a stepped receiving portion and a small diameter hole portion, while the pin has a large diameter portion, a stepped portion and a small diameter portion which are respectively engaged with the large diameter hole portion, the stepped receiving portion and the small diameter hole portion of the pin insertion hole.

8 Claims, 7 Drawing Sheets

_US 7,393,282 B2_

COUPLING STRUCTURE OF STEERING TORQUE TRANSMITTING MEMBER FOR STEERING SHAFT

TECHNICAL FIELD

The present invention relates to a coupling structure of torque transmitting members for a steering shaft.

BACKGROUND ART

Various kinds of couplings are used in a steering apparatus of a vehicle, including an elastic shaft coupling, which comprises an elastic member of rubber interposed between, for example, a yoke of a universal joint and a shaft to be inserted in this yoke, thereby absorbing vibration of an engine or a wheel to suppress transmission of the vibration to a steering wheel.

In such an elastic shaft coupling, a torque is transmitted from the shaft to the yoke through the elastic member in a range having a low torque. However, in a range having a high torque, the transmitting is performed upon direct contact of a stopper face which is provided between the yoke and the shaft.

As shown in FIG. 7A, a stopper plate 3 formed with a cut-away portion 2 and a disc-shaped elastic member $4m$ are secured to a steering shaft 1, and a flange $5m$ of an unrepresented yoke is attached to the shaft 1 through a bush 6.

A pin $8m$ is inserted through the elastic member $4m$ and the flange $5m$ of the yoke through a washer $7m$. An end of the pin $8m$ on the yoke side is a male thread shaft which is thread-engaged with a nut 9 to be fixed. The other end of the pin $8m$ is to be brought into contact (engagement) with the cut-away portion of the stopper plate 3.

Accordingly, in the range with low torque, the elastic member $4m$ transmits, while being elastically deformed, a steering torque by its deforming resistance. On the other hand, in the range with high torque, the other end of the pin $8m$ transmits, while being brought into contact (engagement) with the cut-away portion 2 of the stopper plate 3, a steering torque directly to the shaft 1 from the flange $5m$ of the yoke.

Also in case of FIG. 7B, the structure for transmitting the steering torque is the same as that in the above-described case. However, the end of the pin $8n$ on the yoke side in this case is fixed to the flange $5n$ by clinching. In this case also, the pin $8n$ has a structure with two steps in which it has a large diameter in its part fitted to the elastic member $4n$ and a small diameter in its part fitted to the flange $5n$.

Also in case of FIG. 7C, the structure for transmitting the steering torque is the same as that in the above-described case. In this case, however, the elastic member $4p$ is integrally formed with the washer $7p$ and the end of the pin $8p$ on the yoke side is fixed to the flange $5p$ by clinching. In this case also, the pin $8p$ has a structure with two steps in which it has a large diameter in its part fitted to the elastic member $4p$ and a small diameter in its part fitted to the flange $5p$.

Though not particularly illustrated, there may another structure for fixing the pin ($8m$, $8n$, $8p$) to the flange ($5m$, $5n$, $5p$) in which an unstepped pin is fixed by clinching or a stepped pin is fixed by a thread engaging means.

Incidentally, there is a demand for reinforcement of the strength of a fixing structure between the pin ($8m$, $8n$, $8p$) and the flange ($5m$, $5n$, $5p$).

In such a case, the diameter of the pin ($8m$, $8n$, $8p$) may be enlarged. In this case, however, there arise problems such that the weight thereof becomes greater and that the diameter can not be enlarged when the pin interferes with peripheral components. Also in this case, the width of the cut-away portion 2 of the stopper plate 3 has to be increased, which results in an increased size of the whole structure in order to maintain the strength. Further, the diameter of a pin insertion hole of the elastic member ($4m$, $4n$, $4p$) has to be enlarged, which may resultantly lead to an enlarged size of the elastic member. Still further, the hole diameter of the flange ($5m$, $5n$, $5p$) of the yoke has to be enlarged, which may resultantly lead to an enlarged size of the flange ($5m$, $5n$, $5p$). When there is no enlargement of the size or the reinforcement, the strength is deteriorated.

Still, there may be a case that the hardness of the pin ($8m$, $8n$, $8p$) is reinforced. In such a case, however, a clinching work may become difficult to perform, or the structure may be easily affected by an impact load, or the manufacturing cost may be widely increased due to an additional thermal processing step of the materials.

SUMMARY OF THE INVENTION

The present invention has been contrived taking the circumstances described above into consideration and an object thereof is to provide a coupling structure of steering torque transmitting members for a steering shaft which is capable of enhancing the strength of a pin fixing structure, reducing the number of the constituent components, the manufacturing cost and the weight of the structure, and of improving working and assembling performance (that is, reducing the assembling time).

In order to achieve the above object, according to the present invention, there is provided a coupling structure of steering torque transmitting members for a steering shaft for coupling a pair of steering torque transmitting members interposed in a steering shaft, characterized in that:

one of the steering torque transmitting members and the other of the steering torque transmitting members are adapted to transmit a steering torque through a pin;

the one of the steering torque transmitting members has a pin insertion hole provided with a large diameter hole portion, a stepped receiving portion and a small diameter hole portion; and the pin has a large diameter portion, a stepped portion and a small diameter portion which are respectively engaged with the large diameter hole portion, the stepped receiving portion and the small diameter hole portion of the pin insertion hole.

As described above, according to the present invention, one of the steering torque transmitting members and the other of the steering torque transmitting members are adapted to transmit a steering torque through a pin, the one of the steering torque transmitting members has a pin insertion hole provided with a large diameter hole portion, a stepped receiving portion and a small diameter hole portion, and the pin has a large diameter portion, a stepped portion and a small diameter portion which are respectively engaged with the large diameter hole portion, the stepped receiving portion and the small diameter hole portion of the pin insertion hole. Thus, the pin and the pin insertion hole respectively have stepped structures, so as to concentrate the stress on the large diameter portion. As a result, it is possible to enhance the strength of the pin fixing structure, to reduce the number of the constituent components, the manufacturing cost and the weight of the structure, and to improve working and assembling performance (that is, reducing the assembling time).

DETAILED DESCRIPTION OF THE EMBODIMENTS

Description will be made on a steering apparatus for a vehicle which incorporates therein an elastic shaft coupling employing a coupling structure of steering torque transmitting members according to an embodiment of the present invention, with reference to drawings.

Figure 1A:
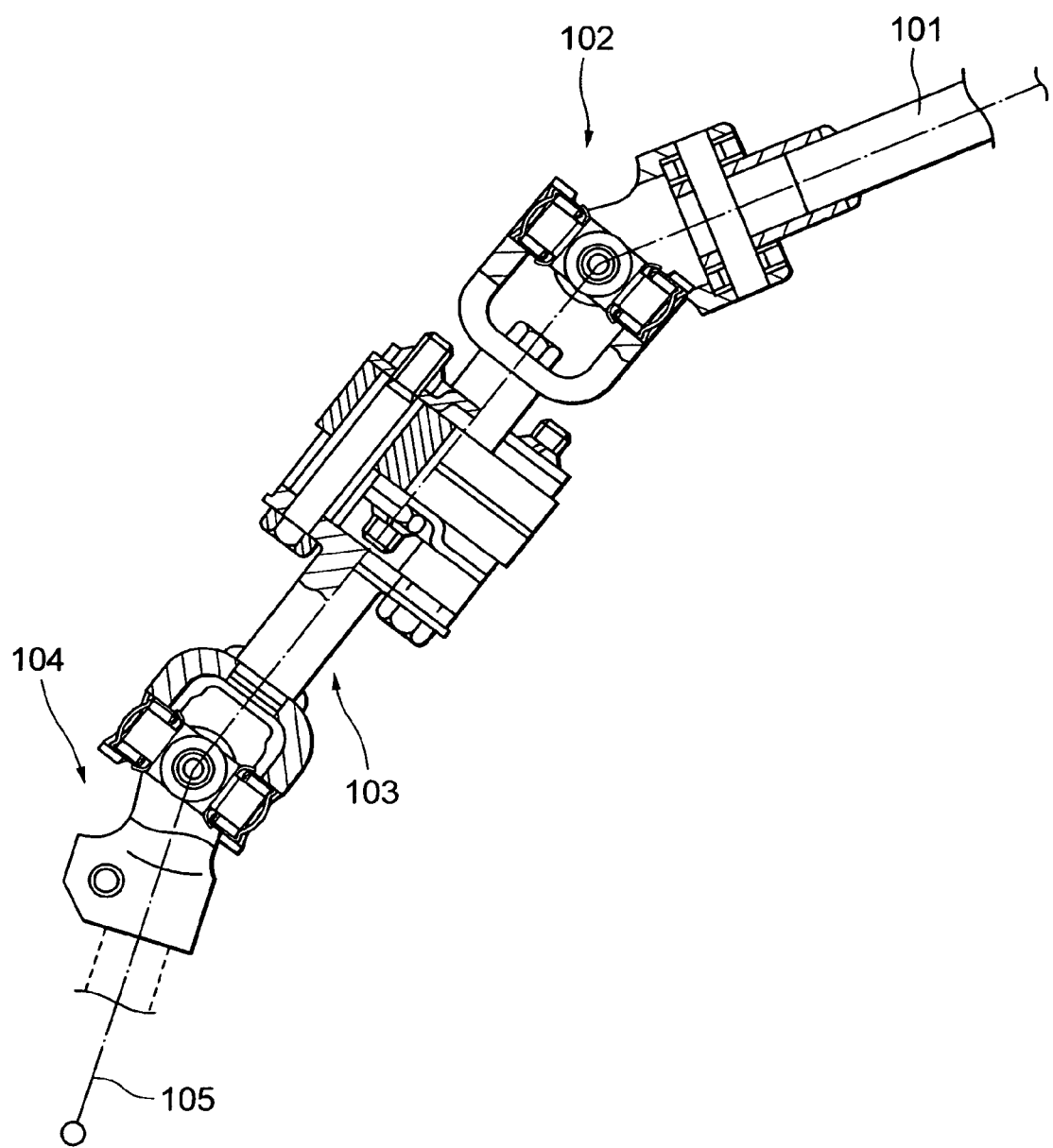
FIG. 1 is a schematic side view of the essential portion of a steering apparatus for a car which incorporates therein a coupling structure according to an embodiment of the present invention.

FIG. 1 is a side view of the essential portion of the steering apparatus for a vehicle which incorporates therein the coupling structure according to an embodiment of the present invention.

As shown in FIG. 1, an intermediate shaft 103 is coupled to a lower end of a main shaft 101 which is coupled to a steering wheel (not shown) through an upper universal joint 102, while an input shaft 105 of a gear apparatus (not shown) is coupled to a lower end of the intermediate shaft 103 through a lower universal joint 104.

Description will be made below on a coupling structure of torque transmitting members for a steering shaft according to an embodiment of the present invention, with reference to drawings.

Figure 2A:
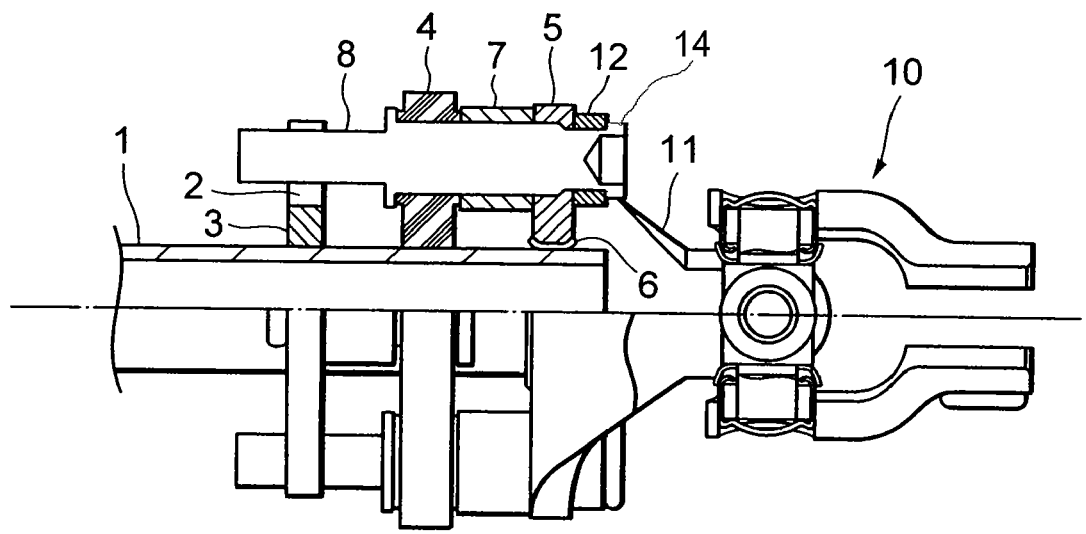
FIGS. 2A and 2B are cross-sectional views of a steering shaft, a yoke of a universal joint, and an elastic shaft coupling interposed therebetween, respectively according to different embodiments of the present invention.
Figure 2B:
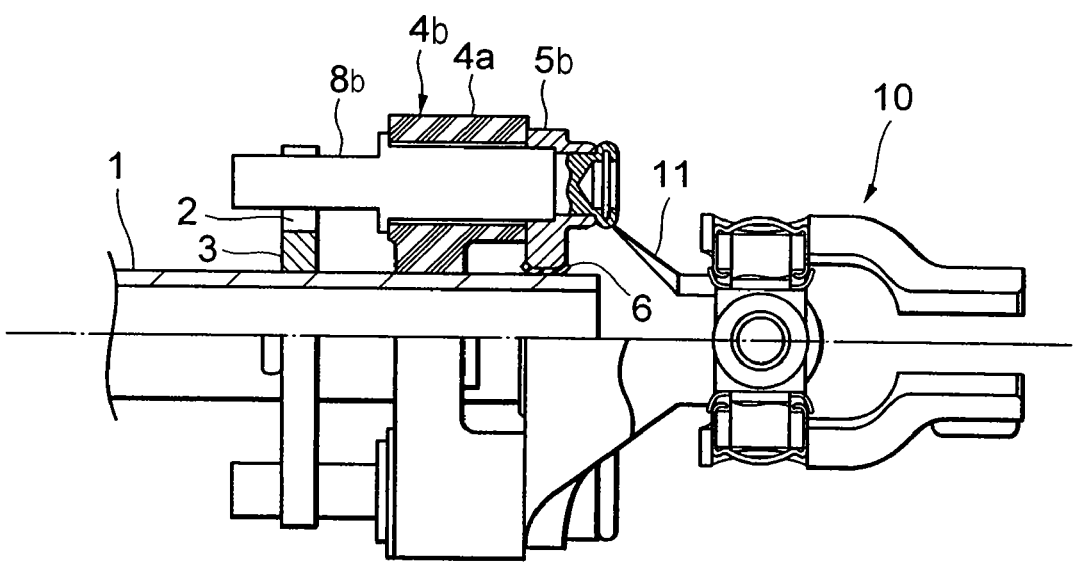

Embodiments Shown in FIGS. 2a and 2b

FIGS. 2A and 2B respectively illustrate different embodiments of the present invention, representing cross-sectional views of a steering shaft, a yoke of a universal joint, and an elastic shaft coupling interposed therebetween.

As shown in FIG. 2A, the steering shaft 1 and the yoke 11 of the universal joint 10 are coupled to each other through an elastic universal joint.

A stopper plate 3 having a cut-away portion 2 which is open outward in the radial direction and a disc-shaped elastic member 4 are secured to the steering shaft 1, while a flange 5 of the yoke 11 is supported on the shaft 1 through a bush 6.

A pin 8 is inserted through the elastic member 4 and the flange 5 through a washer 7. An end 14 of the pin 8 on the side of the yoke 11 is fixed by clinching. Specifically, the washer 12 is attached to the flange 5 by welding, pressure contact, bolt fastening, bonding, or the like, and the end of the pin 8 on the side of the yoke 11 is fixed by clinching through this washer 12.

The other end of the pin 8 is arranged to be brought into contact (engagement) with the cut-away portion of the stopper plate 3.

Accordingly, in a range with low torque, the elastic member 4 transmits, while being elastically deformed, a steering torque by its deforming resistance. On the other hand, in a range with high torque, the other end of the pin 8 transmits, while being brought into contact (engagement) with the cut-away portion 2 of the stopper plate 3, a steering torque directly to the shaft 1 from the flange 5 of the yoke.

As to be described more specifically later, the flange 5 has a pin insertion hole which is formed with a large diameter hole portion, a stepped receiving portion and a small diameter hole portion, while the pin 8 has a large diameter portion, a stepped portion and a small diameter portion which are respectively to be engaged with the large diameter hole portion, the stepped receiving portion and the small diameter hole portion of the pin insertion hole.

As shown in FIG. 2B, in the present embodiment, the pin insertion hole portion 4a of the elastic member 4b is formed to be cylindrical, and the washer 7, though not shown in the drawing, may or may not be used.

The flange 5b further has a pin insertion hole which is formed with a large diameter hole portion, a stepped receiving portion and a small diameter hole portion, while the pin 8b has a large diameter portion, a stepped portion and a small diameter portion which are respectively corresponding to the large diameter hole portion, the stepped receiving portion and the small diameter hole portion of the pin insertion hole.

Figure 3A:
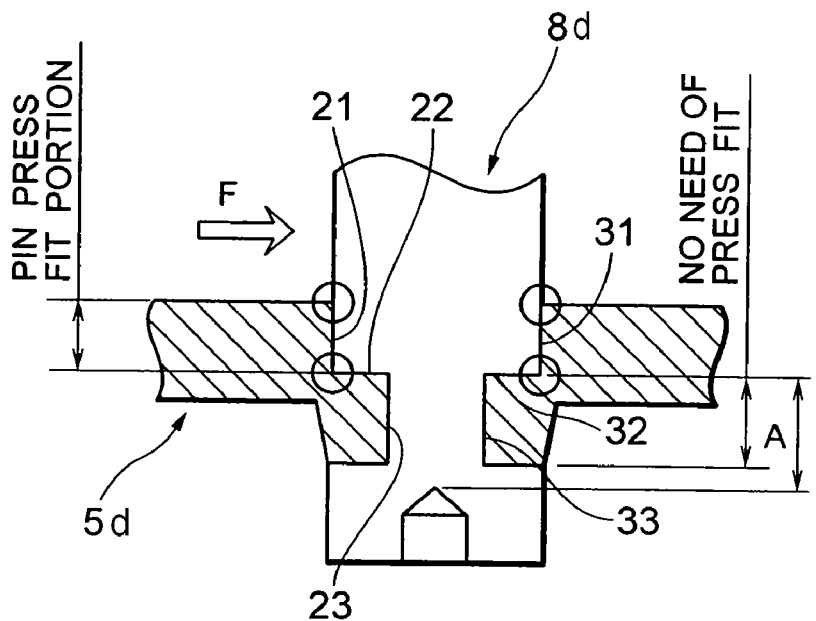
FIG. 3A is a cross-sectional view of a coupling structure between a pin and a flange according to an embodiment of the present invention.
Figure 3B:
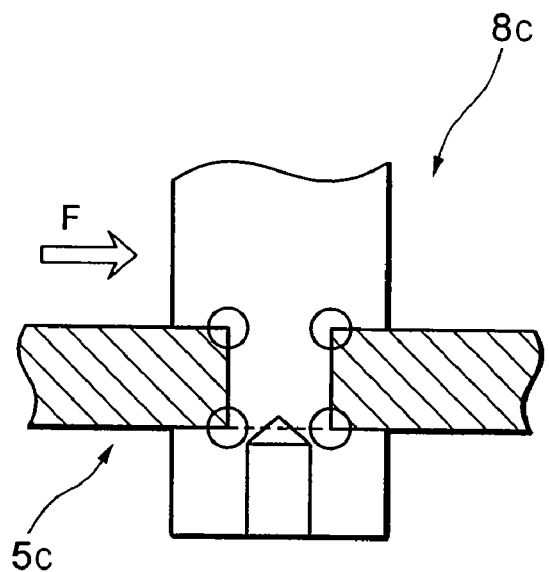
FIG. 3B is a cross-sectional view of a coupling structure between the pin and the flange according to the prior art.

Embodiments Shown in FIGS. 3a and 3b

FIG. 3A is a cross-sectional view of a coupling structure between a pin and a flange according to an embodiment of the present invention, while FIG. 3B is a cross-sectional view of a coupling structure between the pin and the flange according to the prior art.

As shown in FIG. 3B, in case of the prior art, an end of a pin 8c with two steps is clinched to the flange 5c. It is arranged such that stress is concentrated in portions enclosed with circles.

As shown in FIG. 3A, in an embodiment of the present invention, the flange 5d has a pin insertion hole which is formed with a large diameter hole portion 21, a stepped receiving portion 22 and a small diameter hole portion 23, while the pin 8d has a large diameter portion 31, a stepped portion 32 and a small diameter portion 33 which are respectively to be engaged with the large diameter hole portion 21, the stepped receiving portion 22 and the small diameter hole portion 23 of the pin insertion hole. Since the pin 8d and the pin insertion hole are respectively in stepped structures as described above so that the stress can be concentrated in the large diameter portion, it is possible to enhance the strength of the pin fixing structure.

In case of the present embodiment shown in FIG. 3A, the stress concentrated portions enclosed with the circles are generated in the large diameter portion so that a stress value can be reduced and the strength of the pin can be enhanced.

Since the outer side of the small diameter portion 23 of the flange 5d is embossing-shaped, the thickness of the flange 5d can be reduced.

Further, the large diameter portion 31 of the pin 8d is press fitted in the large diameter hole portion 21 of the flange 5d. However, though the small diameter portion 33 of the pin 8d is press fitted in the small diameter hole portion 23 of the flange 5d in the above case, it is suffice if only inserting the small diameter portion 33 therein (with a clearance).

F denotes a repeated load from the stopper plate 3. In case of the structure shown in FIG. 3A, it is possible to further suppress flexure of the pin with respect to F.

Moreover, in case of the prior art shown in FIG. 3B, the top of the hole for clinching and the flange 5c overlap each other so that the rigidity or the strength thereof is decreased. However, in the present embodiment, since the top of the hole for clinching and the flange 5d do not overlap each other, it is possible to obtain high rigidity and strength.

Figure 4A:
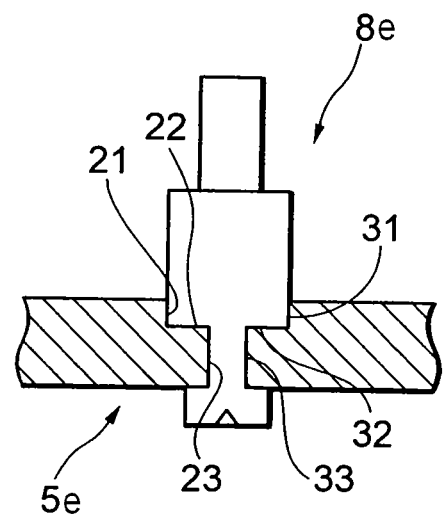
FIGS. 4A, 4B and 4C are respectively cross-sectional views of different coupling structures between the pin and the flange according to embodiments of the present invention.
Figure 4B:
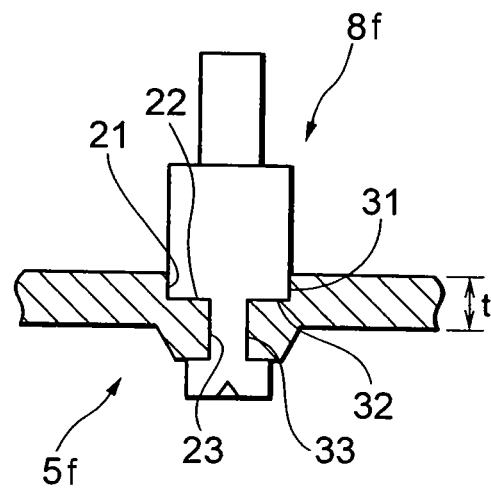
Figure 4C:
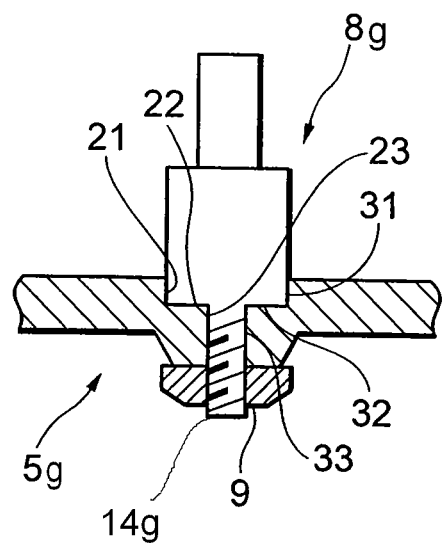

Embodiments Shown in FIGS. 4a to 4c

FIGS. 4A, 4B and 4C are respectively cross-sectional views of coupling structures between the pin and the flange according to different embodiments of the present invention.

As shown in FIG. 4A, in the present embodiment, the flange 5e has a pin insertion hole which is formed with a large diameter hole portion 21, a stepped receiving portion 22 and a small diameter hole portion 23, while the pin 8e has a large diameter portion 31, a stepped portion 32 and a small diameter portion 33 which are respectively to be engaged with the large diameter hole portion 21, the stepped receiving portion 22 and the small diameter hole portion 23 of the pin insertion hole. Since the pin 8e and the pin insertion hole are respectively in stepped structures as described above so that the stress can be concentrated in the large diameter portion, it is possible to enhance the strength of the pin fixing structure.

As shown in FIG. 4B, the outer side of the small diameter portion 23 of the flange 5f may be embossing-shaped, so that the thickness of the flange 5f can be reduced.

As shown in FIG. 4C, an end 14g of the pin 8g may be formed as a male thread shaft and may be thread engaged with and fixed by a nut 9.

Figure 5A:
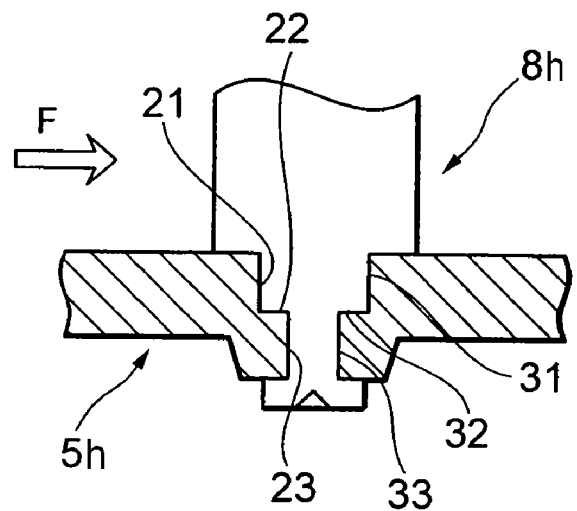
FIGS. 5A and 5B are respectively cross-sectional views of different coupling structures between the pin and the flange according to embodiments of the present invention.
Figure 5B:
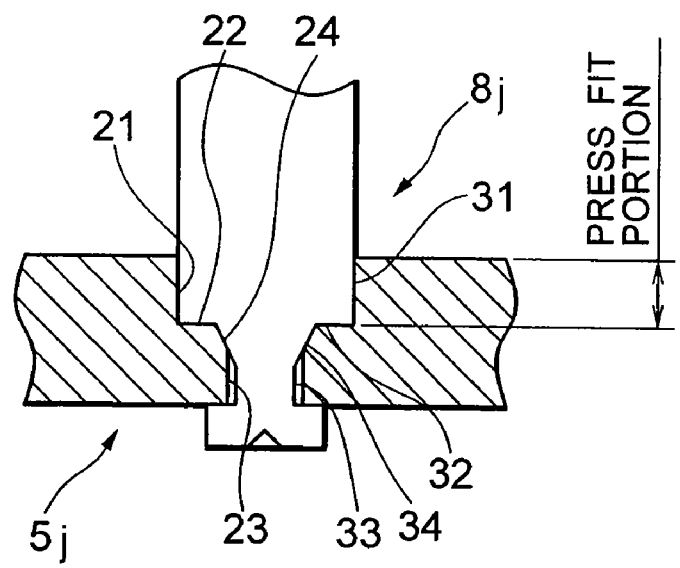

Embodiments Shown in FIGS. 5a and 5b

FIGS. 5A and 5B are respectively cross-sectional views of coupling structures between the pin and the flange according to different embodiments of the present invention.

In case of the embodiment shown in FIG. 5A, the flange 5h has a pin insertion hole which is formed with a large diameter hole portion 21, a stepped receiving portion 22 and a small diameter hole portion 23, while the pin 8h comprises a large diameter portion 31, a stepped portion 32 and a small diameter portion 33 which are respectively to be engaged with the large diameter hole portion 21, the stepped receiving portion 22 and the small diameter hole portion 23 of the pin insertion hole. Since the pin 8h and the pin insertion hole are respectively in stepped structures as described above so that the stress can be concentrated in the large diameter portion, it is possible to enhance the strength of the pin fixing structure.

In addition, the outer side of the small diameter portion 23 of the flange 5h is embossing-shaped, so that the thickness of the flange 5h can be reduced.

Further, the large diameter portion 31 of the pin 8h is press fitted in the large diameter hole portion 21 of the flange 5h. However, though the small diameter portion 33 of the pin 8h is press fitted in the small diameter hole portion of the flange 5h, it is suffice if only inserting the small diameter portion 33 (with a clearance) therein.

F denotes a repeated load from the stopper plate 3. In case of the structure shown in FIG. 5A, it is possible to further suppress the flexure of the pin with respect to F.

In case of the embodiment shown in FIG. 5B, an inclined hole portion 24 is formed between the stepped receiving portion 22 and the small diameter hole portion 23, and an inclined portion 34 corresponding to the inclined hole portion 24 is formed between the stepped portion 32 and the small diameter portion 33. Other arrangements in this embodiment are the same as those in the foregoing embodiments.

Figure 6A:
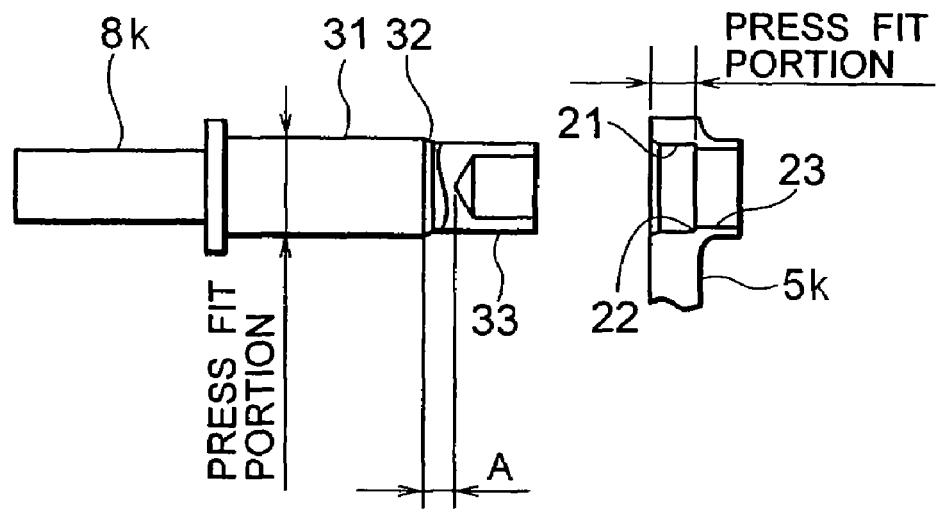
FIG. 6A shows a cross-sectional view of the pin and that of a flange according to an embodiment of the present invention.
Figure 6B:
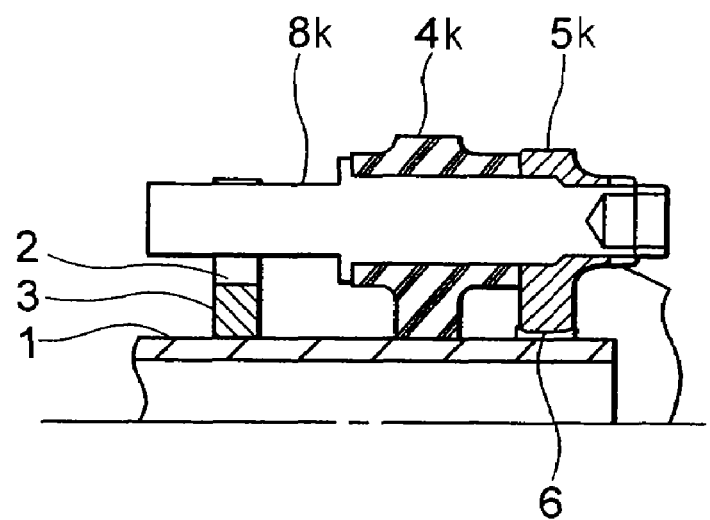
FIG. 6B is a cross-sectional view of the pin and the flange shown in FIG. 6A, in a state that the pin and the flange are assembled.
Figure 7A:
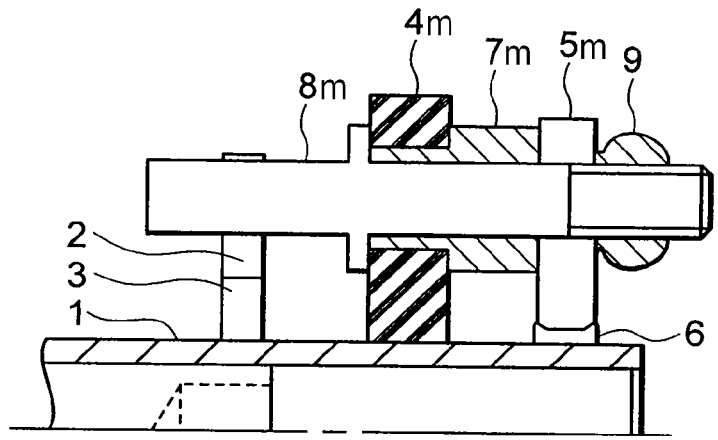
FIGS. 7A, 7B and 7C are respectively cross-sectional views of different coupling structures between the pin and the flange according to the prior art.
Figure 7B:
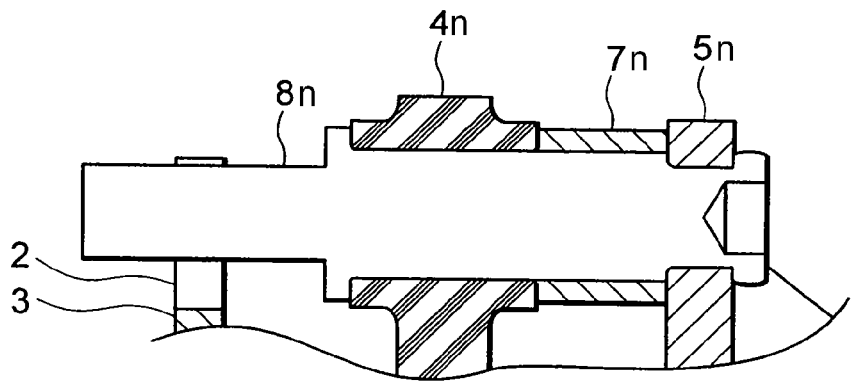
Figure 7C:
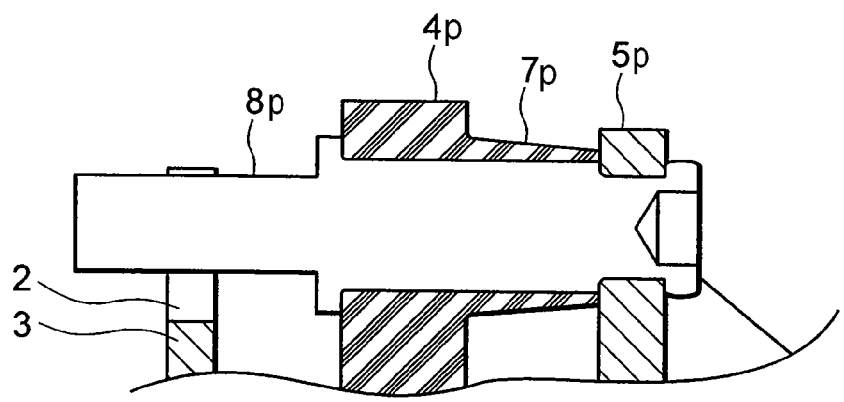

Embodiment Shown in FIGS. 6a and 6b

FIG. 6A is a cross-sectional view of a pin and that of a flange according to an embodiment of the present invention, and FIG. 6B is a cross-sectional view of the pin and the flange shown in FIG. 6A, in a state that the pin and the flange are assembled.

In case of the embodiment shown in FIGS. 6A and 6B, the large diameter portion 31 of the pin 8k is press fitted in the large diameter hole portion 21 of the flange 5k. However, though the small diameter portion 33 of the pin 8k is press fitted in the small diameter hole portion of the flange 5k, it is suffice if only inserting the small diameter portion 33 therein (with a clearance).

Note that the length of the press fitted portion is preferably not less than 5% of the thickness of the flange plate, and most preferably not less than 30% thereof. An interference between the pin and the flange hole is not less than 0.005 mm, and most preferably in a range from 0.05 to 0.5 mm. The length of the portion A (the distance from the stepped receiving portion of the pin to the bottom of the clinching hole) in FIGS. 6A and 6B is not less than 0.5 mm, and is preferably not less than 2 mm. A value which is recommended for clinching may be used as a value for the hardness of the thermal processing of the pin, which is preferably in a range from HV 100 to HV 400. The diameter of the press fitted portion of the pin is not less than φ4, and preferably in a range from φ8 to φ20. When the maximum shearing stress acting on the pin in the present embodiment is compared with that in the conventional structure by numerical analysis under the normal use condition, it is confirmed that about 70% of the stress is decreased.

Note that the present invention is not limited to the foregoing embodiments, but can be altered in variable manners.

As described above, according to the present invention, one of the steering torque transmitting members and the other of the steering torque transmitting members are adapted to transmit a steering torque through a pin, one of the steering torque transmitting members has a pin insertion hole which is formed with a large diameter hole portion, a stepped receiving portion and a small diameter hole portion, and the pin has a large diameter portion, a stepped portion and a small diameter portion which are respectively to be engaged with the large diameter hole portion, the stepped receiving portion and the small diameter hole portion of the pin insertion hole. Thus, the pin and the pin insertion hole respectively have stepped structures, so as to concentrate the stress on the large diameter portion. As a result, it is possible to enhance the strength of the pin fixing structure, to reduce the number of the constituent components, the manufacturing cost and the weight of the structure, and to improve working and assembling performance (that is, reducing the assembling time).

What is claimed is:

1. A coupling structure of torque transmitting members for a shaft for coupling a pair of torque transmitting members interposed in a shaft, characterized in that:
    one of the torque transmitting members and the other of the torque transmitting members are adapted to transmit a torque through an elastic member and a pin;
    said one of the torque transmitting members has a pin insertion hole formed with a large diameter hole portion, a stepped receiving portion and a small diameter hole portion;

said pin has a proximal portion and a distal portion, said proximal portion comprising a large diameter portion, a stepped portion and a small diameter portion which are respectively engaged with the large diameter hole portion, the stepped receiving portion and the small diameter hole portion of the pin insertion hole; and when torque to be transmitted is in a first range, the torque is transmitted through said elastic member and when torque to be transmitted is in a second range, said distal portion of said pin is brought into contact with a portion of said other of the torque transmitting members and the torque is transmitted through said pin, where said second range is higher than said first range.

2. A coupling structure of torque transmitting members for a shaft according to claim 1, wherein said large diameter portion of the pin is press fitted in the large diameter hole portion of the pin insertion hole.

3. A coupling structure of torque transmitting members for a shaft according to claim 2, wherein said pin has a portion projected from said pin insertion hole and with which said pin is fixed to said one of the torque transmitting members by clinching or thread engaging means.

4. A coupling structure of torque transmitting members for a shaft according to claim 3, wherein said torque transmitting members are members for transmitting steering torque of a steering shaft.

5. A coupling structure of torque transmitting members for a shaft according to claim 2, wherein said torque transmitting members are members for transmitting steering torque of a steering shaft.

6. A coupling structure of torque transmitting members for a shaft according to claim 1, wherein said pin has a portion projected from said pin insertion hole and with which said pin is fixed to said one of the torque transmitting members by clinching or thread engaging means.

7. A coupling structure of torque transmitting members for a shaft according to claim 6, wherein said torque transmitting members are members for transmitting steering torque of a steering shaft.

8. A coupling structure of torque transmitting members for a shaft according to claim 1, wherein said torque transmitting members are members for transmitting steering torque of a steering shaft.

* * * * *